US008373797B2

(12) United States Patent
Ishii et al.

(10) Patent No.: US 8,373,797 B2
(45) Date of Patent: Feb. 12, 2013

(54) IMAGE DISPLAY APPARATUS, SIGNAL PROCESSING APPARATUS, IMAGE DISPLAY METHOD, AND COMPUTER PROGRAM PRODUCT

(75) Inventors: Mikio Ishii, Kanagawa (JP); Shoji Kosuge, Kanagawa (JP); Hiroshi Higuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1241 days.

(21) Appl. No.: 11/807,013

(22) Filed: May 25, 2007

(65) Prior Publication Data
US 2007/0273788 A1   Nov. 29, 2007

(30) Foreign Application Priority Data
May 29, 2006   (JP) ................ P2006-147698

(51) Int. Cl.
H04N 7/01 (2006.01)
H04N 11/20 (2006.01)
H04N 5/445 (2011.01)
H04N 7/00 (2011.01)
H04N 3/14 (2006.01)

(52) U.S. Cl. ........ 348/448; 348/445; 348/790; 348/563; 348/473

(58) Field of Classification Search .................. 348/441, 348/445, 448, 790, 797
See application file for complete search history.

(56) References Cited

U.S. PATENT DOCUMENTS

| 5,534,940 A * | 7/1996 | Sato et al. ...................... 348/556 |
| 5,835,150 A * | 11/1998 | Choi ............................. 348/441 |
| 6,128,045 A * | 10/2000 | Anai ............................. 348/556 |
| 6,300,964 B1 * | 10/2001 | Intihar .......................... 345/574 |
| 6,366,706 B1 * | 4/2002 | Weitbruch ..................... 382/254 |
| 7,142,223 B2 * | 11/2006 | Zhu .............................. 345/606 |
| 7,158,186 B2 * | 1/2007 | Selby et al. ................... 348/459 |
| 7,224,401 B2 * | 5/2007 | Ackley et al. ................. 348/556 |
| 7,417,686 B2 * | 8/2008 | Zhu .............................. 348/448 |
| 7,495,646 B2 * | 2/2009 | Kawabe et al. ................ 345/95 |
| 7,528,887 B2 * | 5/2009 | Wyman ......................... 348/452 |
| 7,750,976 B2 * | 7/2010 | Scott et al. .................... 348/558 |
| 7,791,672 B2 * | 9/2010 | Kim et al. ..................... 348/448 |
| 7,911,536 B2 * | 3/2011 | Dunton ......................... 348/556 |
| 2002/0186320 A1 * | 12/2002 | Carlsgaard et al. .......... 348/468 |

(Continued)

FOREIGN PATENT DOCUMENTS

| JP | 51 2331 | 1/1976 |
| JP | 60 39984 | 3/1985 |

(Continued)

*Primary Examiner* — Brian Yenke
(74) *Attorney, Agent, or Firm* — Frommer Lawrence & Haug LLP; William S. Frommer; Ellen Marcie Emas

(57) ABSTRACT

An image display apparatus includes an active-period interlaced-to-progressive (IP) converter configured to convert active periods (video periods) included in interlaced signals into progressive signals; a blanking-period IP converter configured to convert blanking periods included in the interlaced signals into progressive signals; a multiplexer configured to generate and output display data including both the progressive signals associated with the active periods and the progressive signals associated with the blanking periods; and a display unit configured to display the data output from the multiplexer. The blanking-period IP converter is configured to generate the progressive signals associated with the blanking periods by executing IP conversion in which values copied from data included in the interlaced signals or values corresponding to black pixels are set as pixel values of an interpolated field not included in field data of the interlaced signals.

12 Claims, 12 Drawing Sheets

U.S. PATENT DOCUMENTS

| | | |
|---|---|---|
| 2003/0035482 A1* | 2/2003 | Klompenhouwer et al. .......... 375/240.16 |
| 2004/0239802 A1* | 12/2004 | Kim et al. ................ 348/448 |
| 2004/0252759 A1* | 12/2004 | Winder et al. ........ 375/240.12 |
| 2005/0078215 A1* | 4/2005 | Swartz ................ 348/452 |
| 2005/0168636 A1* | 8/2005 | Someya ................ 348/448 |
| 2005/0253963 A1* | 11/2005 | Wong ................ 348/452 |
| 2008/0218630 A1* | 9/2008 | Kempf et al. ............ 348/452 |

FOREIGN PATENT DOCUMENTS

| | | |
|---|---|---|
| JP | 2 266781 | 10/1990 |
| JP | 8-221039 | 8/1996 |
| JP | 3096675 | 8/2000 |
| JP | 2001169199 A * | 6/2001 |
| JP | 2003 309818 | 10/2003 |

* cited by examiner

IMAGE DISPLAY APPARATUS, SIGNAL PROCESSING APPARATUS, IMAGE DISPLAY METHOD, AND COMPUTER PROGRAM PRODUCT

CROSS REFERENCES TO RELATED APPLICATIONS

The present invention contains subject matter related to Japanese Patent Application JP 2006-147698 filed in the Japanese Patent Office on May 29, 2006, the entire contents of which are incorporated herein by reference.

BACKGROUND OF THE INVENTION

1. Field of the Invention

The present invention relates to image display apparatuses, signal processing apparatuses, image display methods, and computer program products. More specifically, the present invention relates to an image display apparatus, a signal processing apparatus, an image display method, and a computer program product with which, in an arrangement where blanking-period data is displayed, degradation of blanking-period data in executing interlaced-to-progressive (IP) conversion of interlaced signals into progressive signals is prevented to achieve accurate data display.

2. Description of the Related Art

As opposed to CRT displays, which employ dot-sequential impulse driving, flat panel displays (FPDs) implemented by liquid crystal displays (LCDs) or organic electroluminescence (EL) displays employ frame-holding display methods. For example, with a typical frame frequency of 60 Hz, a flat panel display holds the same image during each frame display period (1/60 sec=16.7 msec) over the entire display screen.

Most content or broadcasting signals for displaying images are generated in the form of interlaced image data compatible with CRT displays. More specifically, in interlaced image content, each image displayed on the horizontal scanning lines of a CRT display is formed of two fields. First, every other horizontal scanning line is scanned from top to bottom in the first field, and then, every other horizontal scanning line that has not been scanned is scanned from top to bottom in the second field, whereby an image of one frame is displayed.

When such interlaced image content is displayed on a display apparatus that employs a frame-holding display method, such as an LCD, lines carrying display image signals and lines not carrying display image signals occur alternately in each display frame, so that flicker becomes apparent and luminance is reduced to half. In order to solve this problem, interlaced signals are converted into progressive signals, i.e., IP conversion is executed.

As opposed to interlaced scanning, in which every other horizontal scanning line is scanned from the top of the screen, progressive scanning sequentially scans a plurality of horizontal scanning lines (horizontal display lines) forming the screen. The progressive scanning provides image signals of all the lines.

When IP conversion is executed to convert interlaced signals into progressive signals, signals of lines not carrying signals included in the interlaced signals are generated by interpolation. The interlaced signals are converted into progressive signals using the pseudo-signals generated by interpolation, whereby an image corresponding to the progressive signals having signals for all the pixels is displayed. IP conversion is described, for example, in Japanese Unexamined Patent Application Publication No. 8-221039.

However, when IP conversion is executed to convert interlaced signals into progressive signals, signals of horizontal and vertical blanking periods included in original interlaced signals, i.e., signals of horizontal blanking periods for switching between horizontal lines of video signals and signals of vertical blanking periods for switching between fields, are degraded. That is, signal processing such as interpolation is also executed on the blanking-period signals as well as the video signals, causing degradation of the signals.

In blanking periods, auxiliary signals, for example, audio data, or metadata such as content property information, are recorded. Ordinary users do not usually display and check signals of the blanking periods. However, content creators or editors have a demand for displaying the signals of the blanking periods together with video content on a monitor for professional use to check for the presence of the blanking-period signals.

That is, with a monitor for professional use, there exists a demand for checking for the presence of auxiliary signals superposed in horizontal and vertical blanking periods of interlaced signals, such as audio information or metadata. In cathode-ray tube (CRT) monitors that have hitherto been available, it is possible to display blanking-period signals simply by changing display timing or position, for example, by under-scan or horizontal or vertical delay, so that special processing is not needed to display auxiliary signals.

However, in the case of a frame-holding (fixed pixel) monitor, as described earlier, when input signals are interlaced signals, IP conversion is executed to convert the interlaced signals into progressive signals. When the interpolation described above is executed on blanking-period signals, the blanking-period signals are degraded, so that it becomes difficult to check the blanking-period signals on the monitor.

SUMMARY OF THE INVENTION

It is desired to provide an image display apparatus, a signal processing apparatus, an image display method, and a computer program product with which degradation of signals superposed in blanking periods can be prevented even when IP conversion is executed to convert interlaced signals into progressive signals, so that it is possible to display data recorded in blanking periods on a display unit and to check the data reliably without causing degradation of the data.

According to an embodiment of the present invention, there is provided an image display apparatus that displays blanking-period data included in interlaced signals. The image display apparatus includes an active-period interlaced-to-progressive converter configured to convert active periods included in interlaced signals into progressive signals, the active periods being periods in which video data is recorded; a blanking-period interlaced-to-progressive converter configured to convert blanking periods included in the interlaced signals into progressive signals; a multiplexer configured to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods; and a display unit configured to display the data output from the multiplexer. The blanking-period interlaced-to-progressive converter is configured to generate the progressive signals associated with the blanking periods by executing interlaced-to-progressive conversion in which values copied from data included in the interlaced signals or values corresponding to black pixels are set as pixel values of an interpolated field not included in field data of the interlaced signals.

The blanking-period interlaced-to-progressive converter may be configured to generate the progressive signals associated with the blanking periods by executing the interlaced-to-progressive conversion according to a line repeat method in which a current field is repeatedly set to an interpolated field adjacent to the current field.

Alternatively, the blanking-period interlaced-to-progressive converter may be configured to generate the progressive signals associated with the blanking periods by executing the interlaced-to-progressive conversion according to a pseudo-interlace method in which black pixels are set in an interpolated field adjacent to a current field.

Yet alternatively, the blanking-period interlaced-to-progressive converter may be configured to generate the progressive signals associated with the blanking periods by executing the interlaced-to-progressive conversion in which data of a preceding field is set to an interpolated field adjacent to a current field.

Still alternatively, the blanking-period interlaced-to-progressive converter may be configured to generate the progressive signals associated with the blanking periods by executing the interlaced-to-progressive conversion in which data of a field included in the same frame as a current field but different from the current field is set to an interpolated field adjacent to the current field.

According to another embodiment of the present invention, there is provided a signal processing apparatus including an active-period interlaced-to-progressive converter configured to convert active periods included in interlaced signals into progressive signals, the active periods being periods in which video data is recorded; a blanking-period interlaced-to-progressive converter configured to convert blanking periods included in the interlaced signals into progressive signals; and a multiplexer configured to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods. The blanking-period interlaced-to-progressive converter is configured to generate the progressive signals associated with the blanking periods by executing interlaced-to-progressive conversion in which values copied from data included in the interlaced signals or values corresponding to black pixels are set as pixel values of an interpolated field not included in field data of the interlaced signals.

The blanking-period interlaced-to-progressive converter may be configured to generate the progressive signals associated with the blanking periods by executing the interlaced-to-progressive conversion according to a line repeat method in which a current field is repeatedly set to an interpolated field adjacent to the current field.

Alternatively, the blanking-period interlaced-to-progressive converter may be configured to generate the progressive signals associated with the blanking periods by executing the interlaced-to-progressive conversion according to a pseudo-interlace method in which black pixels are set in an interpolated field adjacent to a current field.

Yet alternatively, the blanking-period interlaced-to-progressive converter may be configured to generate the progressive signals associated with the blanking periods by executing the interlaced-to-progressive conversion in which data of a preceding field is set to an interpolated field adjacent to a current field.

Still alternatively, the blanking-period interlaced-to-progressive converter may be configured to generate the progressive signals associated with the blanking periods by executing the interlaced-to-progressive conversion in which data of a field included in the same frame as a current field but different from the current field is set to an interpolated field adjacent to the current field.

According to another embodiment of the present invention, there is provided an image display method of an image display apparatus for displaying blanking-period data included in interlaced signals. The image display method includes the steps of causing an active-period interlaced-to-progressive converter to convert active periods included in interlaced signals into progressive signals, the active periods being periods in which video data is recorded; causing a blanking-period interlaced-to-progressive converter to convert blanking periods included in the interlaced signals into progressive signals; causing a multiplexer to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods; and causing a display unit to display the data output from the multiplexer. The progressive signals associated with the blanking periods are generated by executing interlaced-to-progressive conversion in which values copied from data included in the interlaced signals or values corresponding to black pixels are set as pixel values of an interpolated field not included in field data of the interlaced signals.

According to another embodiment of the present invention, there is provided a computer program product for causing an image display apparatus to display blanking-period data included in interlaced signals. The computer program product includes the steps of causing an active-period interlaced-to-progressive converter to convert active periods included in interlaced signals into progressive signals, the active periods being periods in which video data is recorded; causing a blanking-period interlaced-to-progressive converter to convert blanking periods included in the interlaced signals into progressive signals; causing a multiplexer to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods; and causing a display unit to display the data output from the multiplexer. The progressive signals associated with the blanking periods are generated by executing interlaced-to-progressive conversion in which values copied from data included in the interlaced signals or values corresponding to black pixels are set as pixel values of an interpolated field not included in field data of the interlaced signals.

The computer program product according to the embodiment can be provided, for example, to a general-purpose computer system that is capable of executing various program codes, via a storage medium or a communication medium that provides a program in a computer-readable form, for example, a storage medium such as a compact disc, a floppy disc, or a magneto-optical disc, or a communication medium such as a network. By providing the computer program product carrying a program in a computer-readable form, processing can be executed on the computer system according to the program.

Further objects, features, and advantages of the present invention will become apparent from detailed description of embodiments with reference to the accompanying drawings. A system in this specification refers to a logical combination of a plurality of apparatuses, and is not limited to one in which constituent apparatuses are disposed within the same case.

According to these embodiments of the present invention, in displaying blanking-period data included in interlaced signals, when blanking periods included in the interlaced signals are converted into progressive signals by IP conversion, values copied from data included in the interlaced signals or values corresponding to black pixels are set as pixel values of an interpolated field. More specifically, the IP conversion is executed by one of the following four methods:

1. With a line repeat method, an interpolated field is formed by repeating current lines.
2. With a pseudo-interlace method, an interpolated filed is formed by setting black-pixel lines.
3. With a field unit method, an interpolated field is formed using line data of a field previous to a current field.
4. With a frame unit method, an interpolated field is formed using line data of another field in the same frame as a current line.

By executing the IP conversion according to one of these methods, progressive signals composed only of original interlaced signals not including pseudo-pixel values, or original interlaced signals and black pixels, are generated and output. Thus, display data corresponding to the blanking-period signals, obtained through the IP conversion, does not include pseudo-pixels. Accordingly, it is possible to check blanking-period data reliably.

DESCRIPTION OF THE PREFERRED EMBODIMENTS

Now, image display apparatuses, signal processing apparatuses, image display methods, and computer program products according to embodiments of the present invention will be described with reference to the drawings, in the following order of topics:

1. IP Conversion
2. Processing for Displaying Blanking Signals
3. Details of Apparatus Configuration and Operation 1. IP Conversion First, an overview of ordinary IP conversion will be described. As described earlier, when an interlaced image formed by scanning every other scanning line is displayed on a frame-holding display apparatus, such as a liquid crystal display, pixel values on lines where image signals are missing are determined by interpolation to form a progressive image with full lines. That is, IP conversion is executed.

Figure 1:
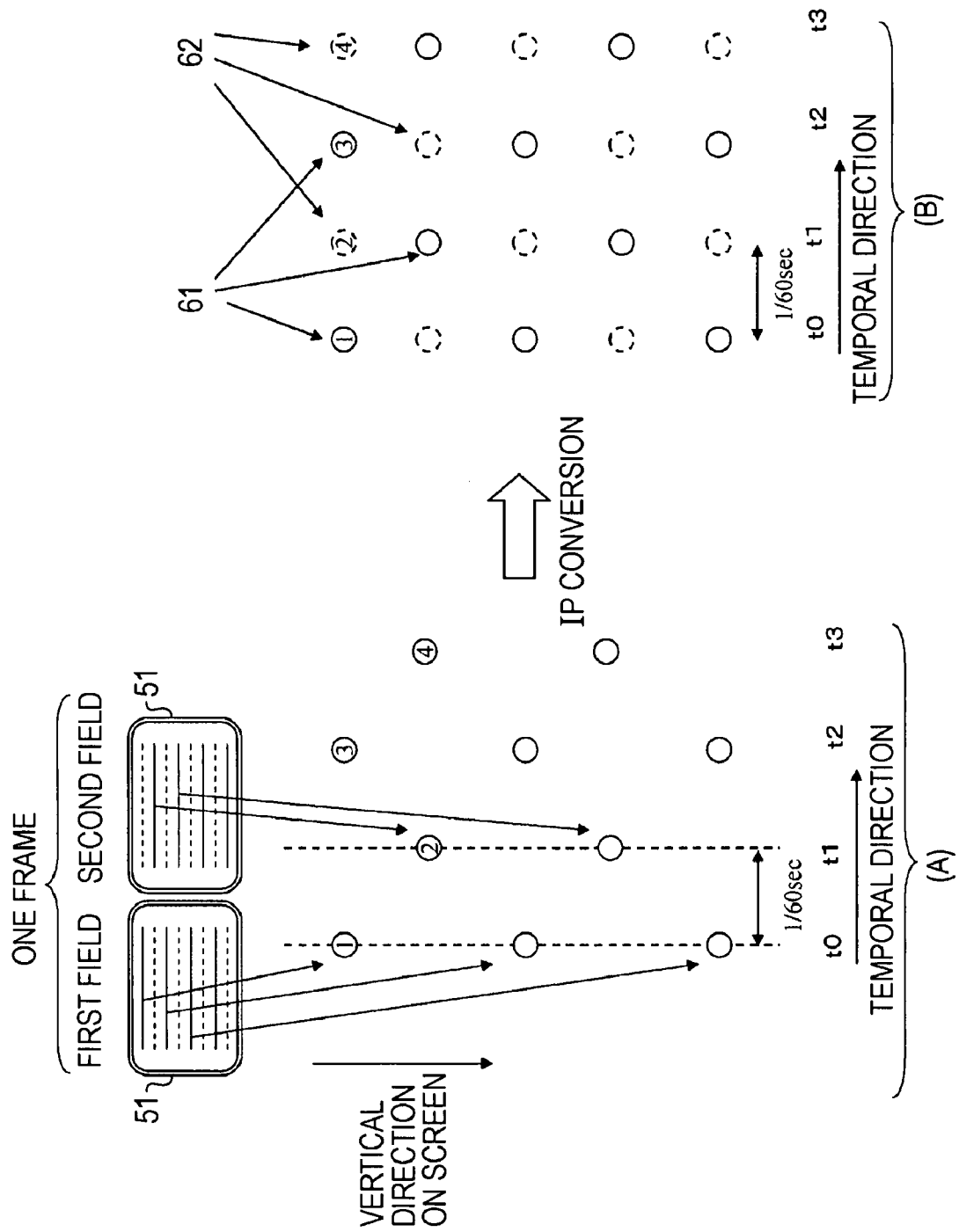
FIG. 1 is a diagram for explaining IP conversion.

FIG. 1 is a diagram showing a scheme of ordinary IP conversion. In FIG. 1, part (A) shows an example of interlaced output before IP conversion, indicating output pixel lines at time t0 to t4 from the left. For example, at time t0, pixel values on every other line of a display unit 51 are output, and at next time t1, pixel values of lines from which pixel values are not output at time t0 are output.

Interlaced signals output at time t0 correspond to first-field signals, interlaced signals output at time t1 correspond to second-field signals, and the signals of these two fields constitute one frame.

When the interlaced signals are displayed on a display unit that employs a frame-holding display method, as described earlier, lines with display image signals and lines without display image signals occur alternately, so that flicker becomes apparent and luminance is halved. In order to overcome this problem, IP conversion is executed to convert interlaced signals into progressive signals.

In FIG. 1, part (B) shows an image obtained through IP conversion. As shown in part (B), original lines 61 with original display image signals and interpolated lines 62 without original display image signals are located alternately in the vertical direction in an image displayed at each timing. Furthermore, the original lines 61 and the interpolated lines 62 are also located alternately in the temporal direction.

Figure 2:
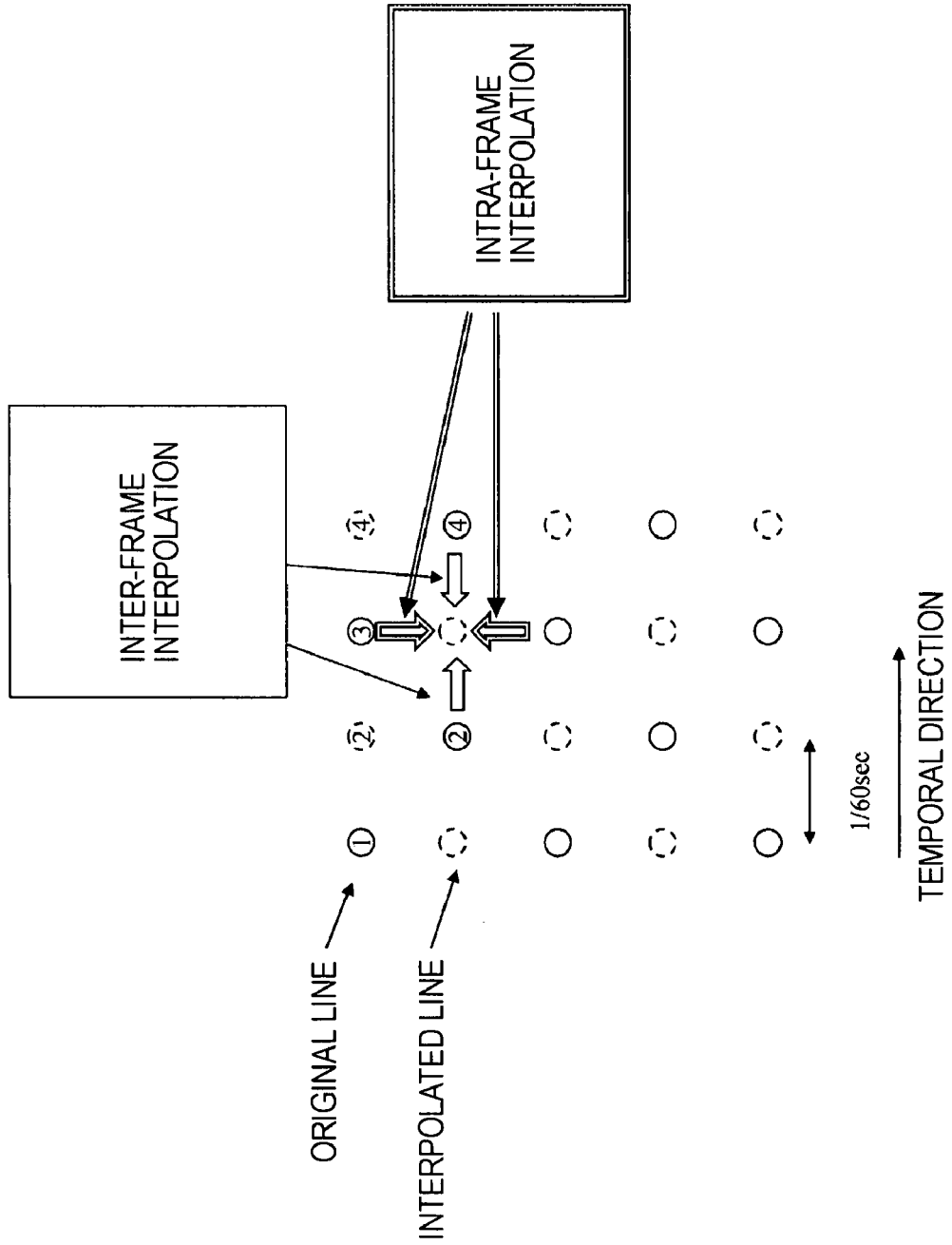
FIG. 2 is a diagram for explaining IP conversion.

Now, methods of ordinary IP conversion will be described with reference to FIG. 2. As shown in FIG. 2, methods of IP conversion include inter-frame interpolation and intra-frame interpolation. The inter-frame interpolation carries out interpolation on the basis of pixel values of corresponding pixels on lines of temporally preceding and succeeding frames. The intra-frame interpolation carries out interpolation on the basis of pixel values of neighboring pixels on upper and lower lines within the same frame. The intra-frame interpolation and the inter-frame interpolation are used by switching or in combination, and the switching or the ratio of combination is controlled in real time according to image features. More specifically, for example, pixel values of interpolation pixels are determined by obtaining motion information and changing the ratio of combination according to the motion information.

As described above, pixel values of interpolated pixels are determined on the basis of pixel values of corresponding pixels along the temporal direction or within the same frame, for example, by calculating an average of the pixel values of neighboring pixels. However, depending on the content of the interlaced image, the pixel values determined by the interpolation described above might be different from pixel values corresponding to the actual image. This could degrade image quality.

The pixels generated by the interpolation described above are pseudo-pixels having pixel values estimated on the basis of pixel values of neighboring pixels within the same frame or along the temporal direction. Thus, a viewer is presented with content altered with pseudo-pixel values. This might be inconvenient for a user wishing for playback of original content as it is.

Furthermore, when data is displayed while executing interpolation for blanking-period data, meaningless pseudo-pixels are generated and displayed. This causes degradation of auxiliary signals included in blanking periods, for example, audio data, or metadata such as content property information. Thus, it becomes difficult to check display data corresponding to the blanking-period data.

2. Processing for Displaying Blanking Signals

Next, schemes of processing for display with which blanking signals are displayed will be described. As described earlier, in blanking periods included in interlaced signals, auxiliary signals, for example, audio data, or metadata such as content property information, are recorded. Ordinary users do not usually display and check the signals of the blanking periods. However, content creators or editors have a demand for displaying the blanking-period signals on a monitor for professional use together with video content in order to check for the presence of the blanking-period signals.

That is, with a monitor for professional use, a demand may exist for checking for the presence of auxiliary signals superposed in horizontal and vertical blanking periods, such as audio information or metadata, as well as video signals. In this case, the blanking-period signals are displayed together with video content on the monitor for professional use. The blanking-period signals can be displayed in various manners. Typical manners of displaying blanking-period signals will be described with reference to FIGS. 3 to 6.

Figure 3:
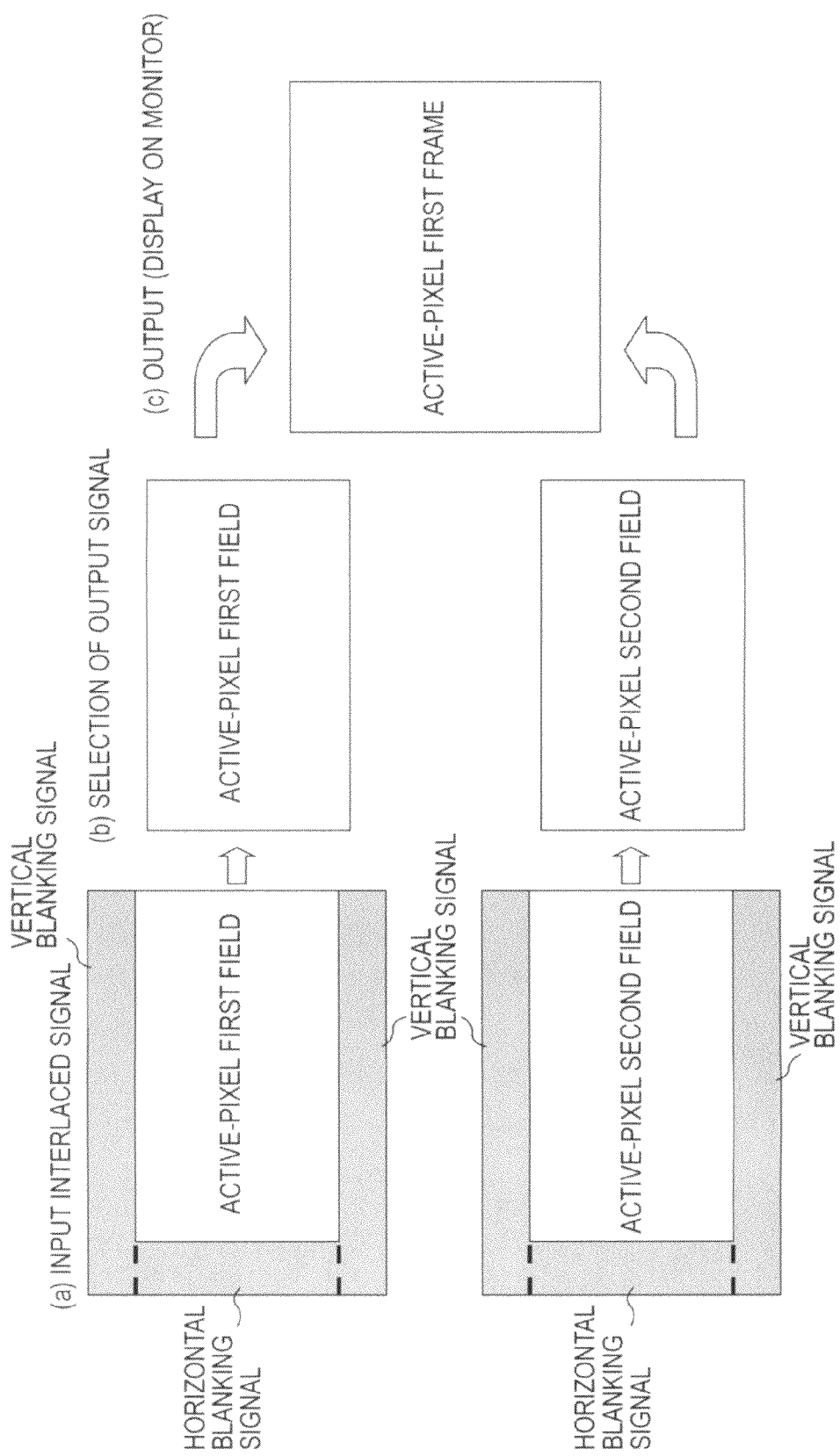
FIG. 3 is a diagram for explaining a scheme of processing for display with which blanking signals are omitted.

FIG. 3 shows an ordinary manner of displaying only video signals without displaying blanking signals. Part (a) of FIG. 3 shows input interlaced signals. As described earlier, signals corresponding to a first field and a second field forming data of one frame are input successively. The signals for the first field and the signals for the second field individually include horizontal blanking signals and vertical blanking signals. The horizontal blanking signals correspond to periods of switching between horizontal lines of video signals, and the vertical blanking signals correspond to periods of switching between frames or fields. In part (a) of FIG. 3, blanking signals are indicated in gray.

Usually, video signal portions not including blanking signals, i.e., video signals of an active-pixel first field and an active-pixel second field are selected, as shown in part (b) of FIG. 3. Then, only the video signals of the first field and the second field are output to a display unit, as shown in part (c) of FIG. 3.

However, with a monitor for professional use by content creators or editors, special processing for display is executed in order to check for the presence of auxiliary signals superposed on horizontal and vertical blanking periods of interlaced signals, such as audio information or metadata, as well as video signals. For example, the blanking-period signals are displayed by under-scan or horizontal or vertical delay.

Figure 4:
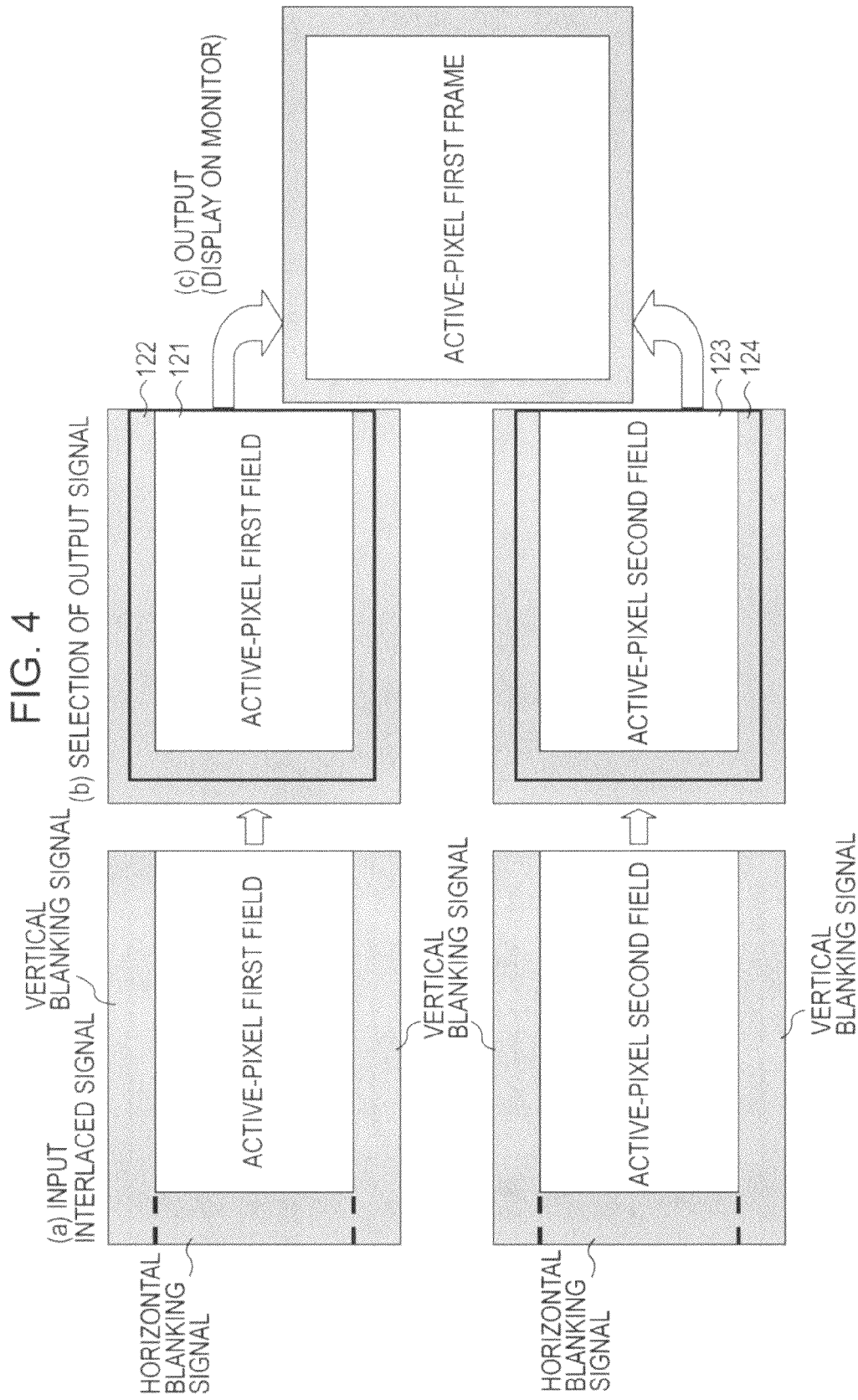
FIG. 4 is a diagram for explaining a scheme of processing for display with which blanking signals are displayed.

FIG. 4 is a diagram showing a scheme of displaying blanking-period signals by the under-scan method. Part (a) of FIG. 4 shows input interlaced signals corresponding to the signals shown in part (a) of FIG. 3, composed of signals corresponding to a first field and a second field forming data of one frame. The first-field signals and the second-field signals individually include horizontal blanking signals and vertical blanking signals.

In the under-scan method, as shown in part (b) of FIG. 4, signal portions including an active-pixel first field 121 and surrounding blanking signals 122 are selected as output signals, and signal portions including an active-pixel second field 123 and surrounding blanking signals 124 are selected and output signals. Then, these output signals are output to a display unit. As shown in part (c) of FIG. 4, the result is displayed with a display area for the blanking signals provided around the video signals of the first frame. A viewer can confirm, on the basis of change in the blanking-period signals, that auxiliary information, such as audio information or metadata, is recorded.

Figure 5:
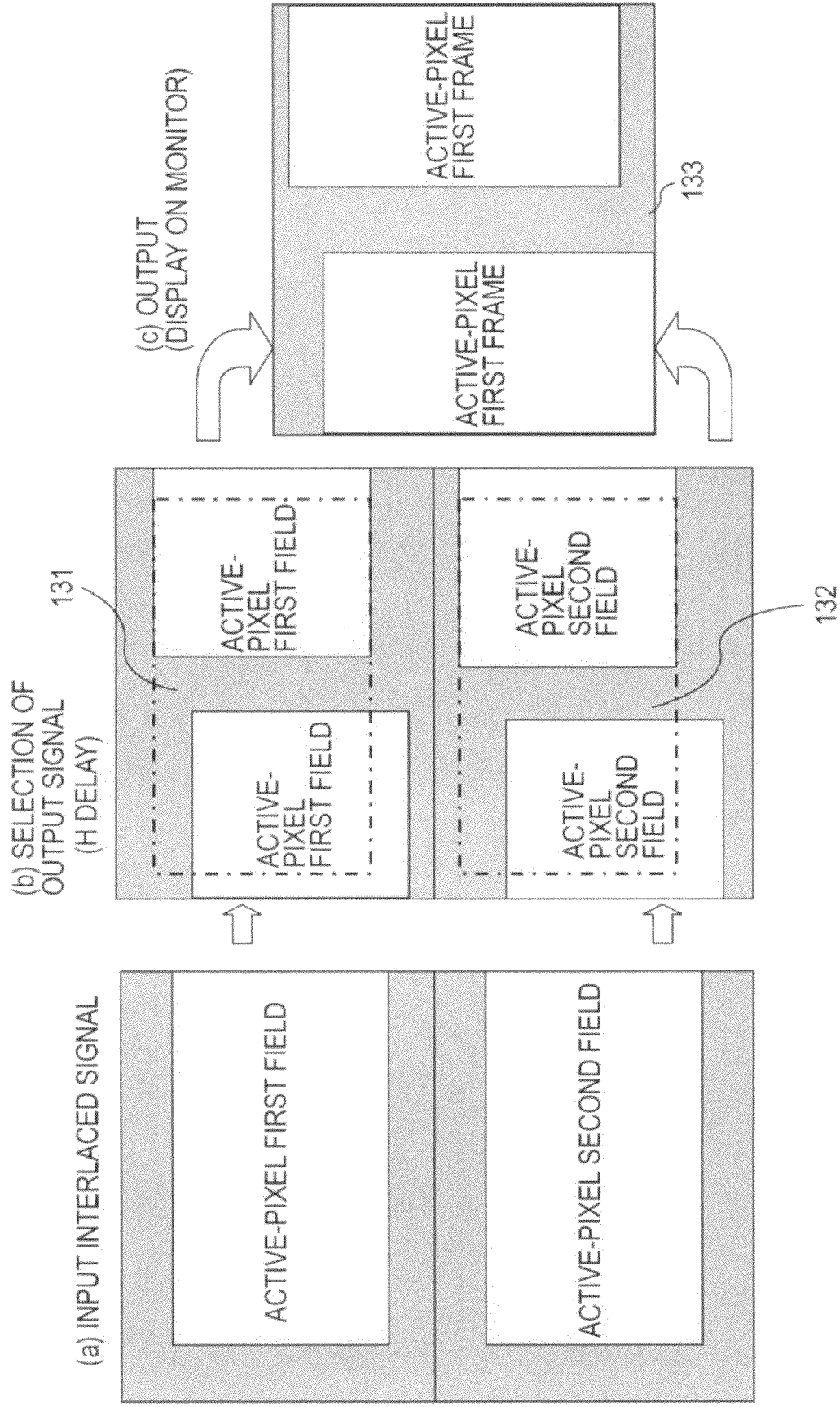
FIG. 5 is a diagram for explaining a scheme of processing for display with which blanking signals are displayed.

FIG. 5 is a diagram showing a scheme of displaying blanking-period signals by the horizontal delay (H-delay) method. Part (a) of FIG. 5 shows input interlaced signals corresponding to the signals shown in part (a) of FIG. 3, composed of signals corresponding to a first field and a second field forming data of one frame. The first-field signals and the second-field signals individually include horizontal blanking signals and vertical blanking signals, as indicated in gray.

In the horizontal delay (H-Delay) method, data delayed in the horizontal direction is generated and output data is selected, as shown in part (b) of FIG. 5. Referring to part (b) of FIG. 5, output data 131 corresponds to a rectangular data area selected from the data delayed in the horizontal direction, and is composed of signal portions including an active-pixel first field and surrounding blanking signals. Output data 132 corresponds to a rectangular data area selected from the data delayed in the horizontal direction, and is composed of signal portions including an active-pixel second field and surrounding blanking signals. These pieces of data are selected as output signals and output to a display unit. As shown in part (c) of FIG. 5, display areas of blanking signals 133 are provided between and around video signals of frames divided as left and right segments. A viewer can confirm, on the basis of change in the blanking-period signals, that auxiliary information, such as audio information or metadata, is recorded.

Figure 6:
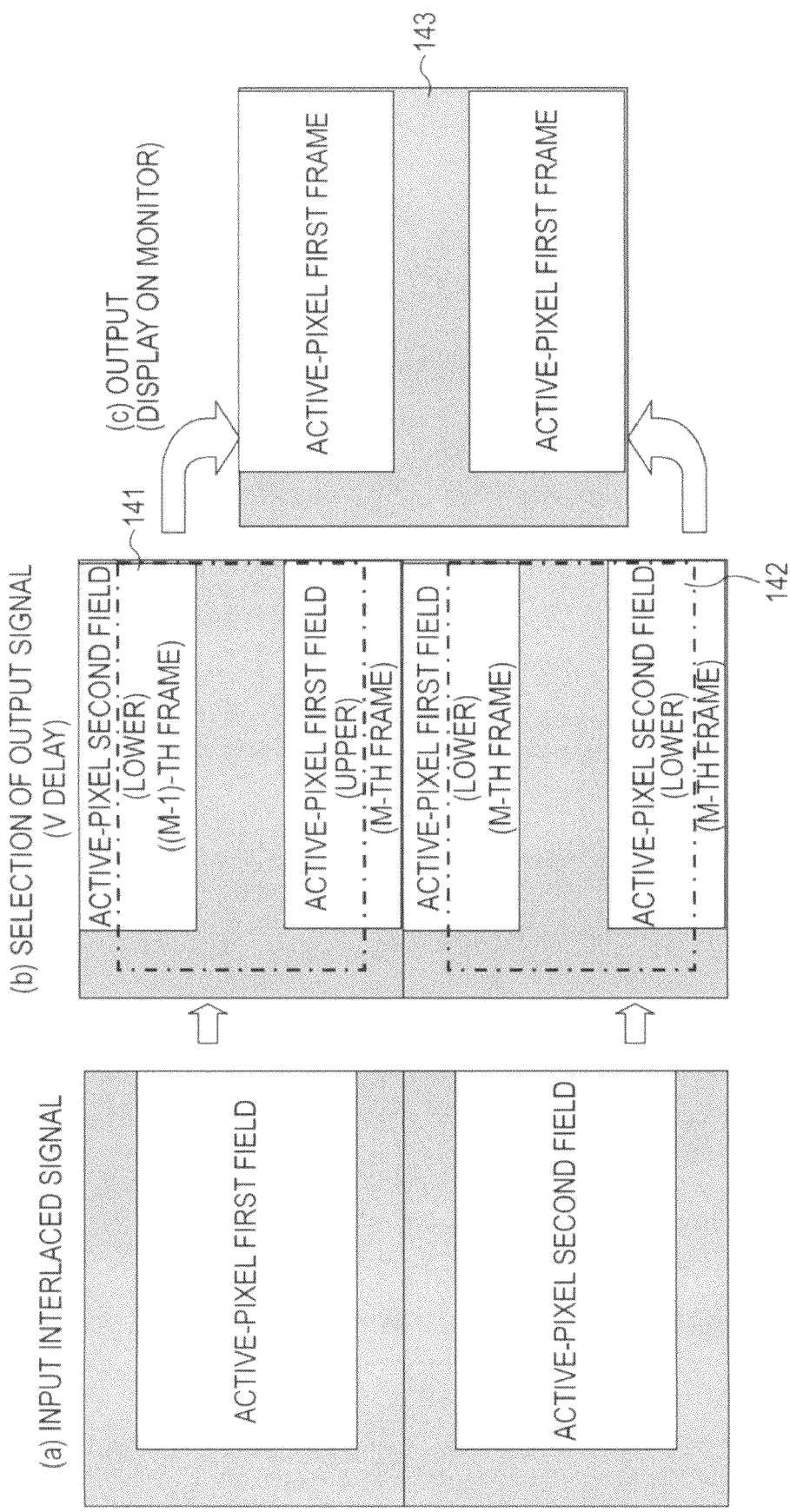
FIG. 6 is a diagram for explaining a scheme of processing for display with which blanking signals are displayed.

FIG. 6 is a diagram showing a scheme of displaying blanking-period signals by the vertical delay (V-delay) method. Part (a) of FIG. 6 shows input interlaced signals corresponding to the signals shown in part (a) of FIG. 3, composed of signals corresponding to a first field and a second field forming data of one frame. The first-field signals and the second-field signals individually include horizontal blanking signals and vertical blanking signals, as indicated in gray.

In the vertical delay (V-delay) method, data delayed in the vertical direction is generated and is selected output data, as shown in part (b) of FIG. 6. Referring to part (b) of FIG. 6, output data 141 corresponds to a rectangular data area selected from the data delayed in the vertical direction, and is composed of signal portions including a lower half (LOWER) area of an active-pixel second field of an (M−1)-th frame, an upper half (UPPER) area of an active-pixel first field of an M-th frame, and intervening blanking signals. Output data 142 corresponds to a rectangular data area selected from the data delayed in the vertical direction, and is composed of signal portions including a lower half (LOWER) area of the active-pixel first field of the M-th frame, an upper half (UPPER) area of an active-pixel second field of the M-th frame, and intervening blanking signals.

These signals are selected as output signals and output to a display unit. As a result, as shown in part (c) of FIG. 6, display areas for blanking signals 143 are provided between and around segments of frame video signals divided vertically. A viewer can confirm, on the basis of change in the blanking-period signals, that auxiliary information, such as audio information or metadata, is recorded.

With a CRT monitor, blanking signals can be displayed properly through the processing described with reference to FIGS. 4 to 6. On the other hand, with a frame-holding display apparatus, such as an LCD, since IP conversion is executed to convert interlaced signals into progressive signals, when IP conversion is executed on signals of horizontal blanking periods and vertical blanking periods, the signals become degraded. This might lead to failure of checking the presence or absence of signals reliably. This embodiment is directed to overcoming the problem described above. Now, the processing according to this embodiment will be described below in detail.

3. Details of Apparatus Configuration and Operation

Now, the apparatus configuration and operation according to this embodiment will be described in detail. According to this embodiment, in an arrangement where video is displayed on a display apparatus that employs a frame-holding display method, such as an LCD or an organic EL display, degradation of signals superposed in blanking periods is prevented even when IP conversion is executed to convert interlaced signals into progressive signals.

More specifically, when IP conversion is executed to convert interlaced signals into progressive signals, signal areas are divided into blanking-period signals and active video period signals including video signals, and IP conversion is executed in different manners in the individual signal areas.

Figure 7:
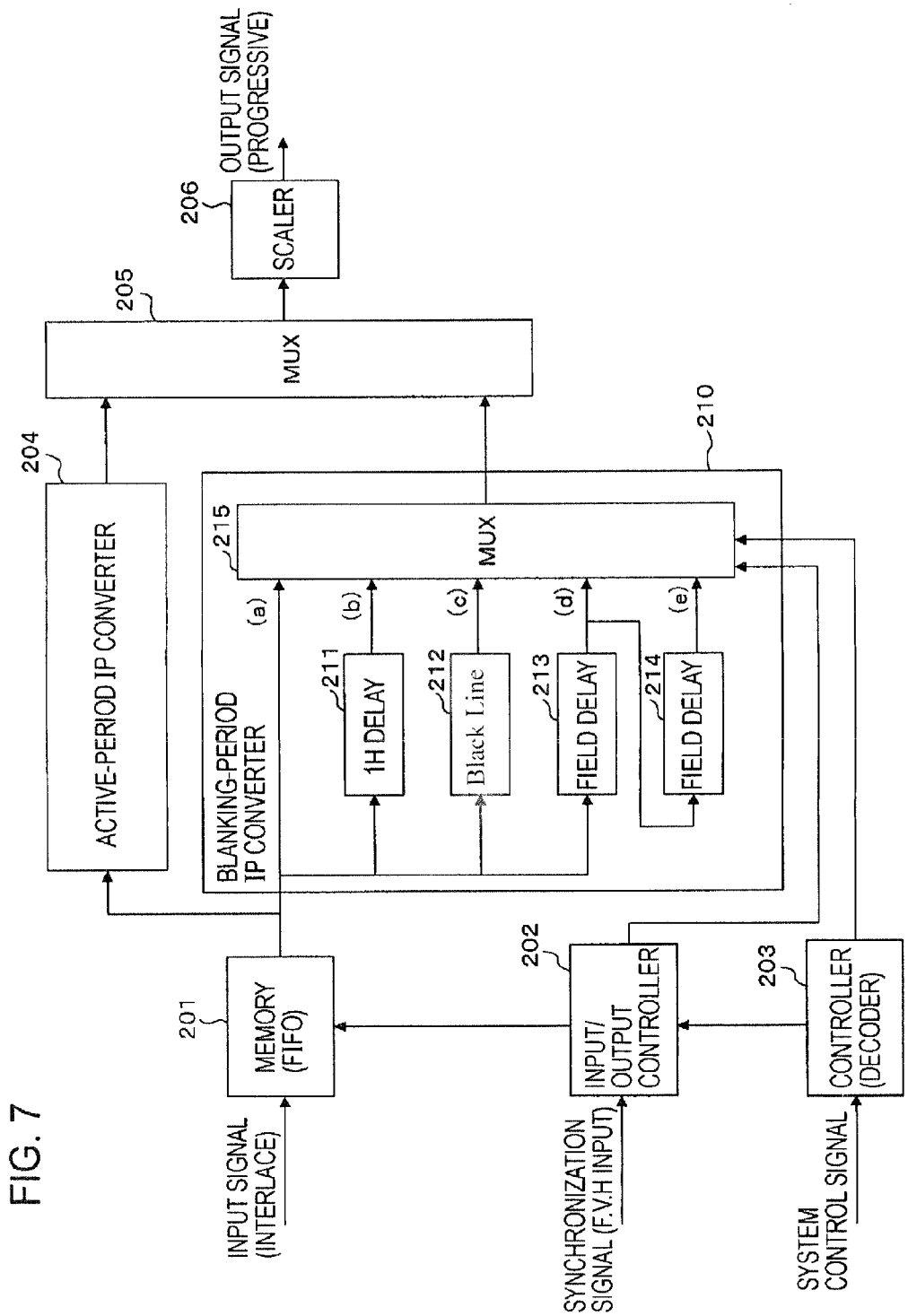
FIG. 7 is a block diagram of a signal processing circuit in an image display apparatus according to an embodiment of the present invention.

FIG. 7 is a block diagram of a signal processing circuit in the image display apparatus according to this embodiment. As shown in FIG. 7, the image display apparatus according to this embodiment includes a memory (FIFO) 201, an input/output controller 202, a controller 203, an active-period IP converter 204, a blanking-period IP converter 210, a multiplexer 205, and a scaler 206. The memory 201 receives input of and outputs interlaced signals to be processed. The input/output controller 202 controls input and output on the basis of synchronization signals. The controller 203 outputs control information to processing units. The active-period IP converter 204 executes IP conversion on active pixels, i.e., video signals. The blanking-period IP converter 210 executes IP conversion on blanking-period signals. The multiplexer 205 combines the active-period signals (video signals) and the blanking-period signals that have undergone the IP conversion to generate and output display data including progressive signals of both active periods and blanking periods. The scaler 206 executes scaling in accordance with the size of a display unit.

The blanking-period IP converter 210 includes a 1H delaying unit (1H DELAY) 211 that causes a delay corresponding to one horizontal line, a black-line converter (BLACK LINE) 212 that converts a horizontal line into a black-pixel line, a field delaying unit 213 (FIELD DELAY) that causes a delay corresponding to one field, a field delaying unit (FIELD DELAY) 214 that causes a further delay corresponding to one field to the output of the field delaying unit (FIELD DELAY) 213, and a multiplexer 215 that combines outputs (a) to (e) from the memory 201 and the processing units 211 to 214 and outputs the result to the multiplexer 205.

The interlaced signals to be processed are input to the memory (FIFO) 201 according to an input-signal clock. Furthermore, synchronization signals are input to the input/output controller 202. The data input to the memory (FIFO) 201 is read by the active-period IP converter 204 and the blanking-period IP converter 210, where IP conversion is executed individually. The data is read from the memory (FIFO) 201 at a clock rate that is twice or more faster than the rate of the clock defining timing of input of signals to the memory (FIFO) 201 so that data delays caused by the blanking-period IP converter 210 does not cause delay of output.

The data is read by the active-period IP converter 204 and the blanking-period IP converter 210 from the memory (FIFO) 201 according to control signals fed from the input/output controller 202 that controls input and output on the basis of synchronization signals so that active-pixel-period data composed of video signals is output to the active-period IP converter 204 and so that blanking-period signals are output to the blanking-period IP converter 210.

The active-period IP converter 204, which executes IP conversion of video signals, executes IP conversion on data of active pixels, i.e., video-signal periods not including blanking periods, in a manner of interpolation that has hitherto been used. More specifically, as described earlier with reference to FIGS. 1 and 2, pixel values of interpolated pixels are determined by inter-frame interpolation that executes interpolation using lines of temporally preceding and succeeding frames and inter-frame interpolation that executes interpolation using upper and lower lines within the same frame, with the inter-frame interpolation and the intra-frame interpolation used by switching or in combination as controlled in real time in accordance with image features, whereby the interlaced signals are converted into progressive signals and the progressive signals are output to the multiplexer 205.

The IP conversion of blanking-period signals is executed by the blanking-period IP converter 210. The IP conversion will be described later in detail. The active-period signals (video signals) that have undergone the IP conversion by the active-period IP converter 204 and the blanking-period signals that have undergone the IP conversion by the blanking-period IP converter 210 are combined by the multiplexer 205, and the combined signals are scaled by the scaler 206 for output in accordance with the size of the display unit. For example, the data displayed on the display unit includes display areas of blanking-period data, as described earlier with reference to FIGS. 4 to 6.

Next, the IP conversion of blanking-period signals, executed by the blanking-period IP converter 210, will be described in detail with reference to FIGS. 8 to 11. The IP conversion of blanking-period signals is executed by a method selected from the following four methods:

1. Line repeat method
2. Pseudo-interlace method
3. Field unit method
4. Frame unit method Specific examples of processing according to these four methods will be described below.

1. Line Repeat Method

First, the IP conversion of blanking-period signals according to the line repeat method, executed by the blanking-period IP converter 210, will be described with reference to FIG. 8.

Figure 8:
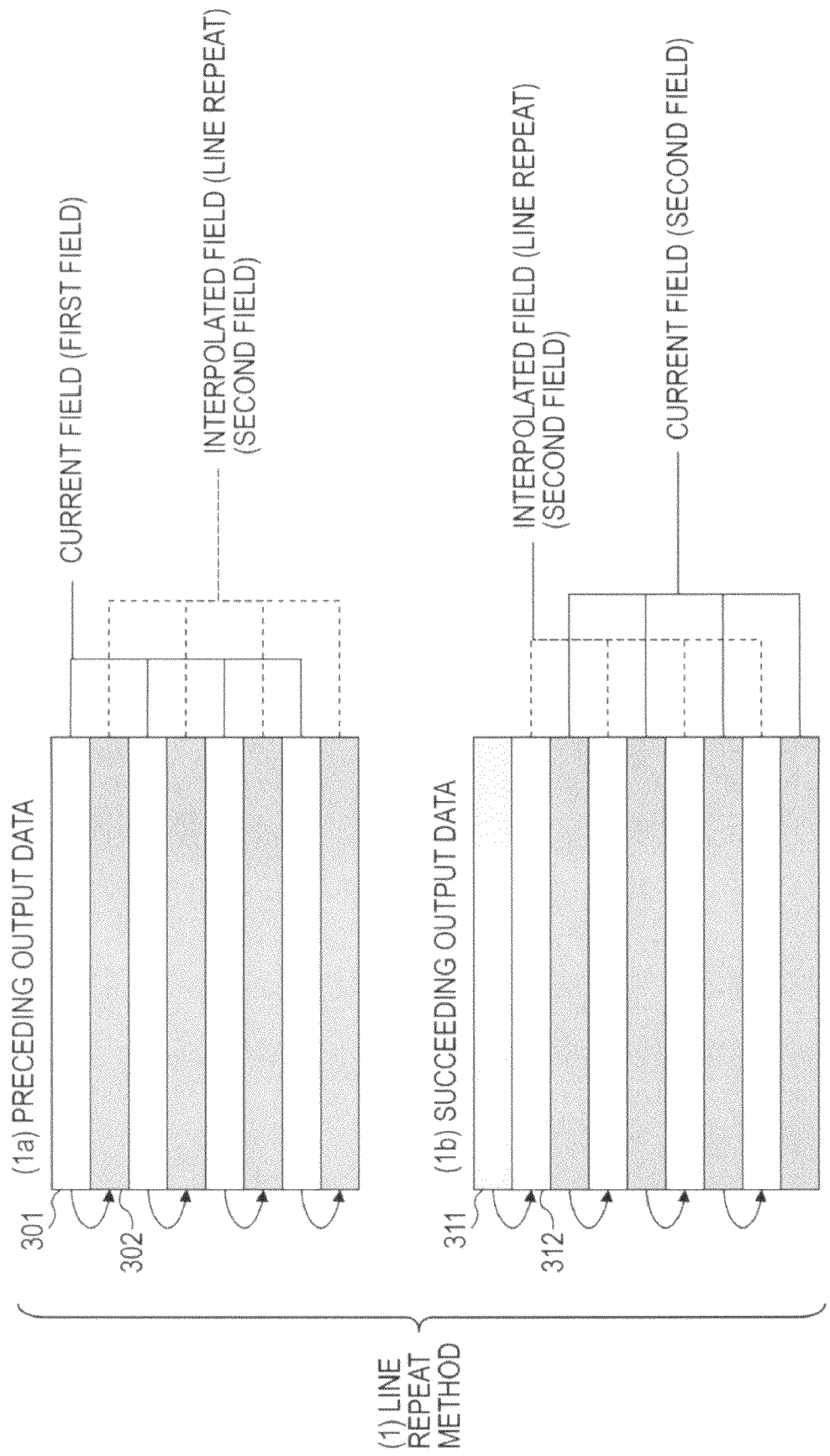
FIG. 8 is a diagram for explaining IP conversion of blanking periods according to a line repeat method, executed by the image display apparatus according to the embodiment.

FIG. 8 shows a specific example of the IP conversion of blanking-period signals according to the line repeat method. In FIG. 8, parts (1a) and (1b) show preceding data and succeeding data, respectively, obtained through the IP conversion of blanking signals, output from the blanking-period IP converter 210.

Basically, lines to be interpolated, not existing in interlaced signals, are generated by directly copying pixel values of a current field included in the interlaced signals. For example, referring to part (1a) of FIG. 8, a line 301 is a line of a current field included in the interlaced signals, and a line 302 is a line to be interpolated, not actually existing in the interlaced signals. In place of the line 302, the line 301 is repeated. That is, one line is repeated to form two lines. Thus, ordinary IP conversion, such as interpolation based on a plurality of pixel values, is not executed, and original interlaced signals are repeated by repeating the same signal line. Therefore, problems such as reduction in the luminance of display data signals do not occur, so that it is possible to reliably check auxiliary information in blanking periods. For example, data that serves as a source of copying for interpolated lines 312 shown in part (1b) of FIG. 8 is replaced with blanking data, so that the blanking data is copied and output.

The blanking-period IP converter 210 combines outputs (a) to (e) from the memory 201 and the processing units 211 to 214 as appropriate to generate output data in the form shown in FIG. 8, and outputs the output data to the multiplexer 205 as a result of the IP conversion of the blanking-period signals. More specifically, the blanking-period IP converter 210 shown in FIG. 7 generates output data in the form shown in FIG. 8 on the basis of an output from the memory 201 and an output from the 1H delaying unit (1H DELAY) 211 that causes a delay corresponding to one horizontal line, and outputs the output data to the multiplexer 205 as a result of the IP conversion of the blanking-period signals. In this example, one piece of output (shown in part (1a) or (1b) of FIG. 8) completes with data of one field.

In this case, a delay of processing for display, i.e., a system delay corresponding to one line, occurs. However, in the blanking-period data displayed on the display unit, original interlaced signals are repeated without other signals being mixed therewith. Thus, it is possible to reliably check auxiliary information in the blanking periods.

2. Pseudo-Interlace Method

Next, the IP conversion of blanking-period signals according to the pseudo-interlace method, executed by the blanking-period IP converter 210, will be described with reference to FIG. 9.

Figure 9:
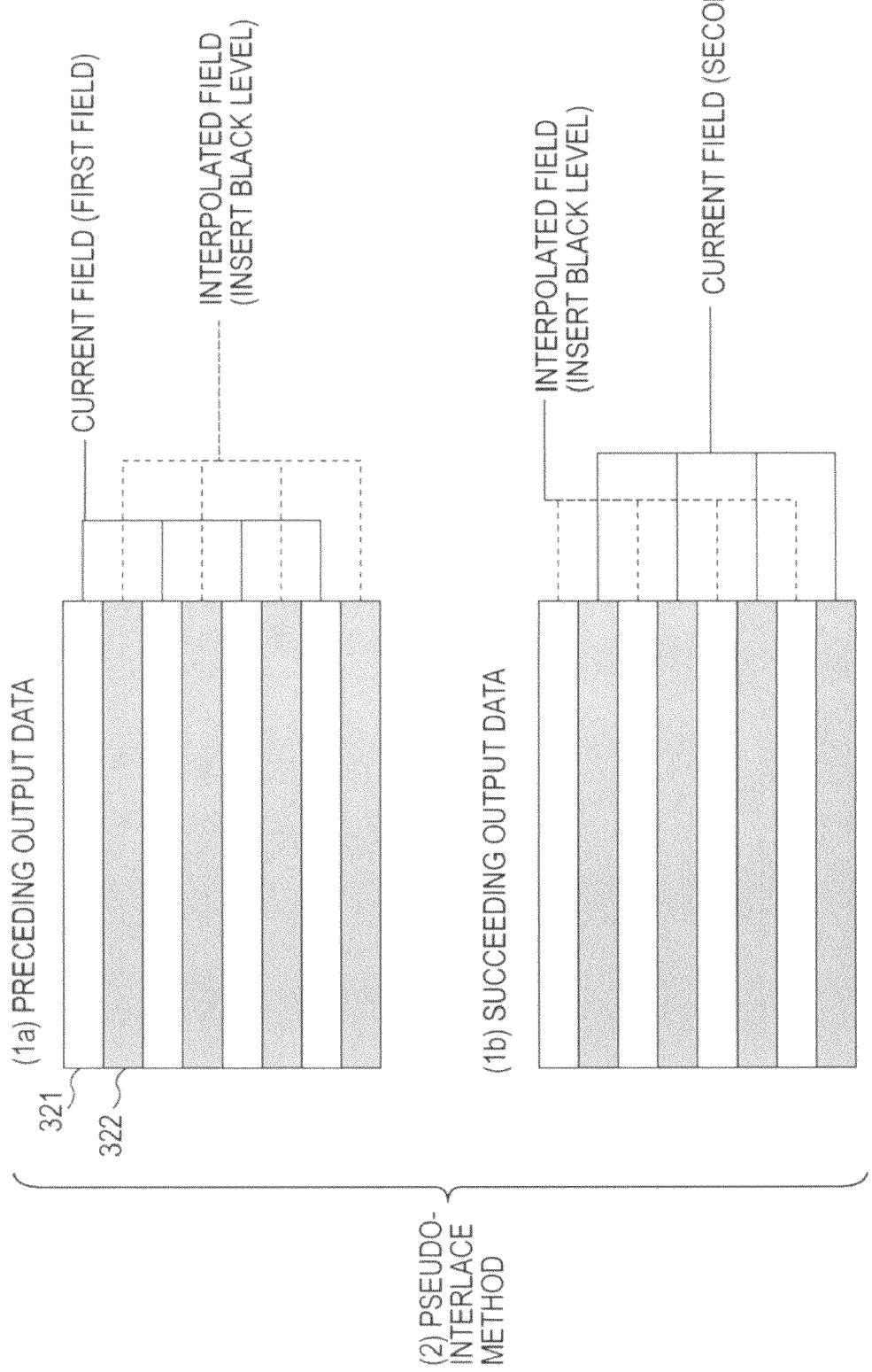
FIG. 9 is a diagram for explaining IP conversion of blanking periods according to a pseudo-interlace method, executed by the image display apparatus according to the embodiment.

FIG. 9 shows a specific example of the IP conversion of blanking-period signals according to the pseudo-interlace method. In FIG. 9, parts (1a) and (1b) show preceding data and succeeding data, respectively, obtained through the IP conversion of blanking signals, output from the blanking-period IP converter 210.

Basically, lines to be interpolated, not existing in the interlaced signals, are set to be lines formed of pixels of a black level. For example, a line 321 shown in part (1a) of FIG. 9 is a line of a current field included in the interlaced signals, and a line 322 is a line to be interpolated, not actually existing in the interlaced signals. The line 322 is set to be a pixel line with the black level. Thus, although the luminance level of the blanking-period data is reduced, the original interlaced signals are output as they are. Accordingly, it is possible to reliably check auxiliary information in the blanking periods.

The blanking-period IP converter 210 shown in FIG. 7 combines outputs (a) to (e) from the memory 201 and the processing units 211 to 214 as appropriate to generate output data in the form shown in FIG. 9, and outputs the output data to the multiplexer 205 as a result of the IP conversion of the blanking-period signals. More specifically, the blanking-period IP converter 210 shown in FIG. 7 generates output data in the form shown in FIG. 9 on the basis of the output from the memory 201 and the output from the black-line converter (BLACK LINE) 212 that converts a horizontal line into a black-pixel line, and outputs the output data to the multiplexer 205 as a result of the IP conversion of the blanking-period signals. Also in this example, one piece of output (shown in part (1a) or (1b) of FIG. 9) completes with data of one field.

In this case, a delay of display processing, i.e., a system delay, does not occur. As blanking-period data displayed on the display unit, original interlaced signals are output as they are without other signals being mixed therewith. Thus, it is possible to reliably check auxiliary information in the blanking periods. In this case, the scaling ratio is chosen to be 1:1, since black lines and other lines might be mixed when enlargement or reduction occurs by scaling. However, scaling may be executed when the arrangement is such that the scaling does not cause mixing of black lines and other lines.

3. Field Unit Method

Next, the IP conversion of blanking-period signals according to the field unit method, executed by the blanking-period IP converter 210, will be described with reference to FIG. 10.

Figure 10:
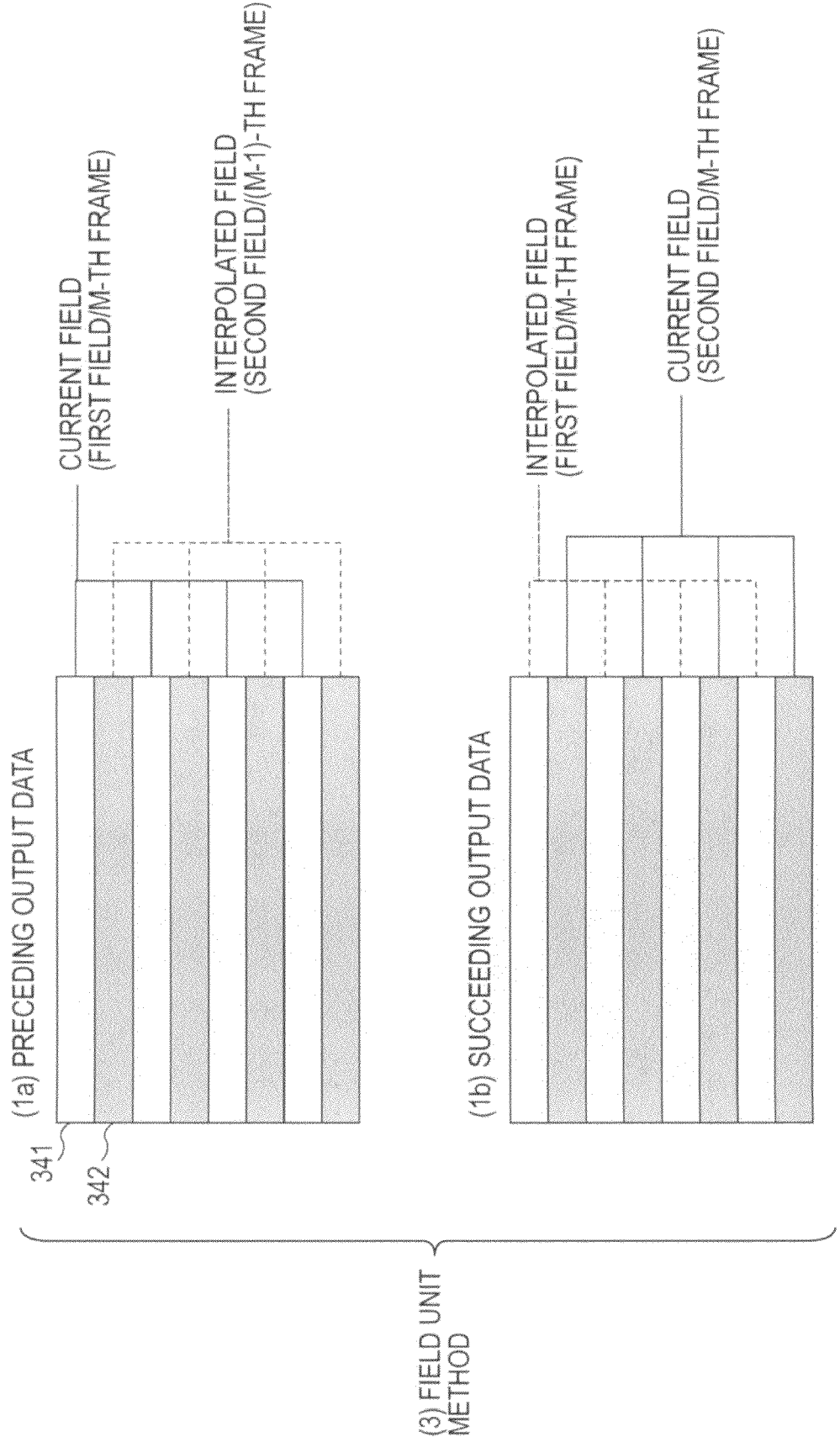
FIG. 10 is a diagram for explaining IP conversion of blanking periods according to a field unit method, executed by the image display apparatus according to the embodiment.

FIG. 10 shows a specific example of the IP conversion of blanking-period signals according to the field unit method. In FIG. 10, parts (1a) and (1b) show preceding data and succeeding data, respectively, obtained through the IP conversion of blanking signals, output from the blanking-period IP converter 210.

Basically, lines to be interpolated, not existing in interlaced signals, are padded with line data of a previous field. For example, a line 341 shown in part (1a) of FIG. 10 is a line of a current field included in the interlaced signals, and a line 342 is a line to be interpolated, not actually existing in the interlaced signals. The line 342 is padded with a line in a field previous to the current field.

For example, as shown in part (1a) of FIG. 10, when the current field is a first field of an M-th frame, data of a second field of an (M−1)-th frame is set as the interpolated field. When the current field is a second field of the M-th frame as shown in part (1b) of FIG. 10, data of the first field of the M-th frame is set as the interpolated field.

Thus, in the case shown in part (1a) of FIG. 10, data of different frames coexists. On the other hand, in the case shown in part (1b) of FIG. 10, the output is composed of only data within the same frame. In this example, output data is all generated using signals included in the interlaced signals. Thus, pseudo-pixel values are not generated for output, and data included in the original interlaced signals are output for sure. Accordingly, it is possible to check auxiliary information in the blanking periods.

The blanking-period IP converter 210 shown in FIG. 7 combines outputs (a) to (e) from the memory 201 and the processing units 211 to 214 as appropriate to generate output data in the form shown in FIG. 10, and outputs the output data to the multiplexer 205 as a result of the IP conversion of the blanking-period signals. More specifically, the blanking-period IP converter 210 shown in FIG. 7 generates output data in the form shown in FIG. 10 on the basis of the output from the memory 201 and the output from the field delaying unit (FIELD DELAY) 213 that causes a delay corresponding to one field, and outputs the output data to the multiplexer 205 as a result of the IP conversion of the blanking-period signals.

In this case, a delay of display processing, i.e., a system delay, does not occur. As the blanking-period data displayed on the display unit, original interlaced signals are correctly output. Thus, it is possible to reliably check auxiliary information in the blanking periods.

4. Frame Unit Method

Next, the IP conversion of blanking-period signals according to the frame unit method, executed by the blanking-period IP converter 210, will be described with reference to FIG. 11.

Figure 11:
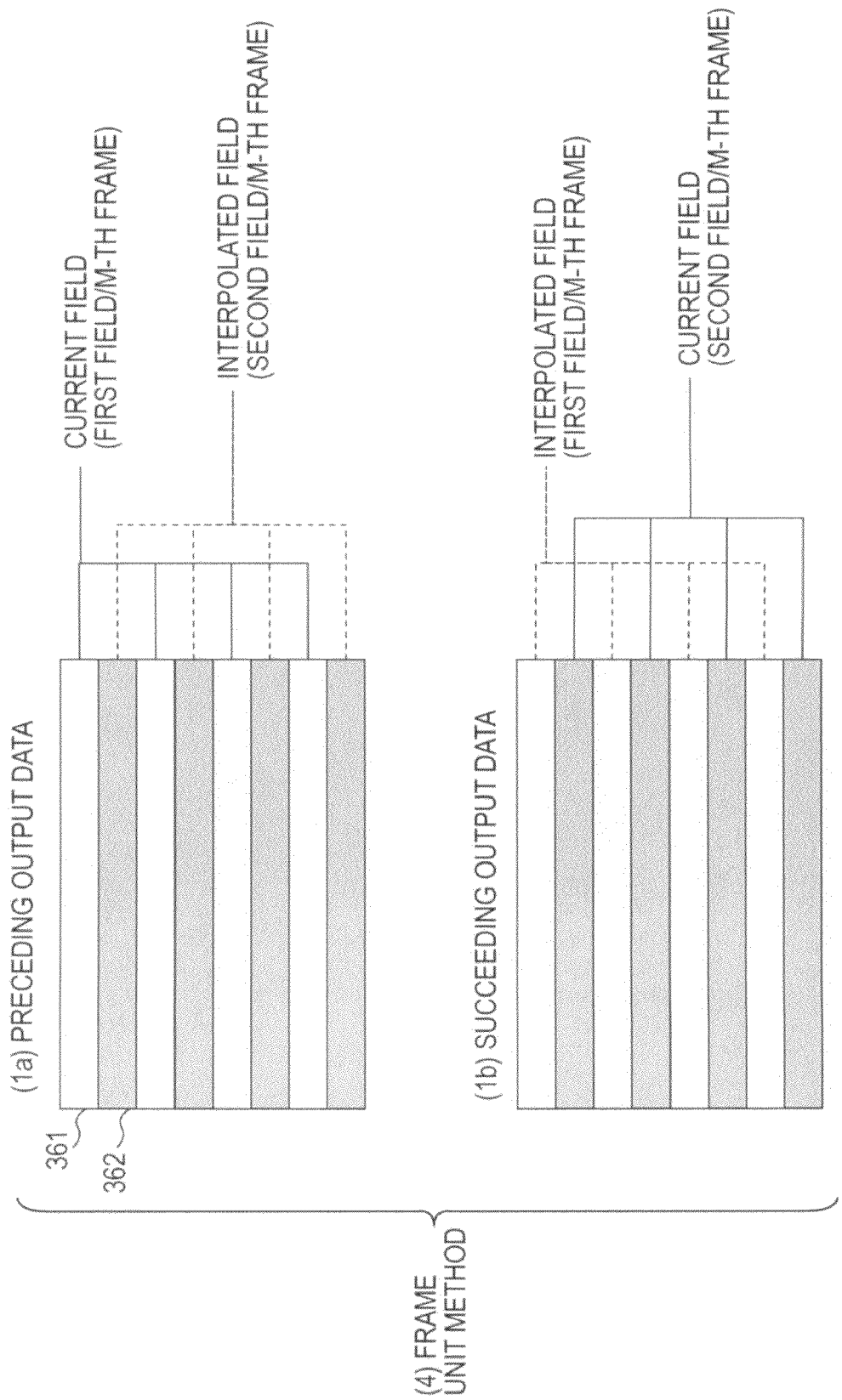
FIG. 11 is a diagram for explaining IP conversion of blanking periods according to a frame unit method, executed by the image display apparatus according to the embodiment.

FIG. 11 shows a specific example of the IP conversion of blanking-period signals according to the frame unit method.

In FIG. 11, parts (1a) and (1b) show preceding data and succeeding data, respectively, obtained through the IP conversion of blanking signals, output from the blanking-period IP converter 210.

Basically, lines to be interpolated, not existing in interlaced signals, are padded with line data of another field within the same frame. For example, a line 361 shown in part (1a) of FIG. 11 is a line of a current field included in the interlaced signals, and a line 362 is a line to be interpolated, not actually existing in the interlaced signals. The line 362 is padded with a line in another in included in the same frame as the current field.

For example, as shown in part (1a) of FIG. 11, when the current field is a first field of an M-th frame, data of a second field of the M-th frame is set as the interpolated field. When the current field is a second field of the M-th frame as shown in part (1b) of FIG. 11, data of the first field of the M-th frame is set as the interpolated field.

Thus, the output is composed of only data within the same frame. In this example, output data is all generated using signals included in the interlaced signals. Thus, pseudo-pixel values are not generated for output, and data included in the original interlaced signals are output for sure. Accordingly, it is possible to check auxiliary information in the blanking periods.

The blanking-period IP converter 210 shown in FIG. 7 combines outputs (a) to (e) from the memory 201 and the processing units 211 to 214 as appropriate to generate output data in the form shown in FIG. 11, and outputs the output data to the multiplexer 205 as a result of the IP conversion of the blanking-period signals. More specifically, the blanking-period IP converter 210 shown in FIG. 7 generates output data in the form shown in FIG. 11 on the basis of the output from the memory 201, the output from the field delaying unit (FIELD DELAY) 213 that causes a delay corresponding to one field, and the output from the field delaying unit (FIELD DELAY) 214 that causes a further delay corresponding to one field, and outputs the output data to the multiplexer 205 as a result of the IP conversion of the blanking-period signals.

In this case, a delay of display processing, i.e., a system delay corresponding to one field, occurs. However, as the blanking-period data displayed on the display unit, original interlaced signals are correctly output. Thus, it is possible to reliably check auxiliary information in the blanking periods.

Figure 12:
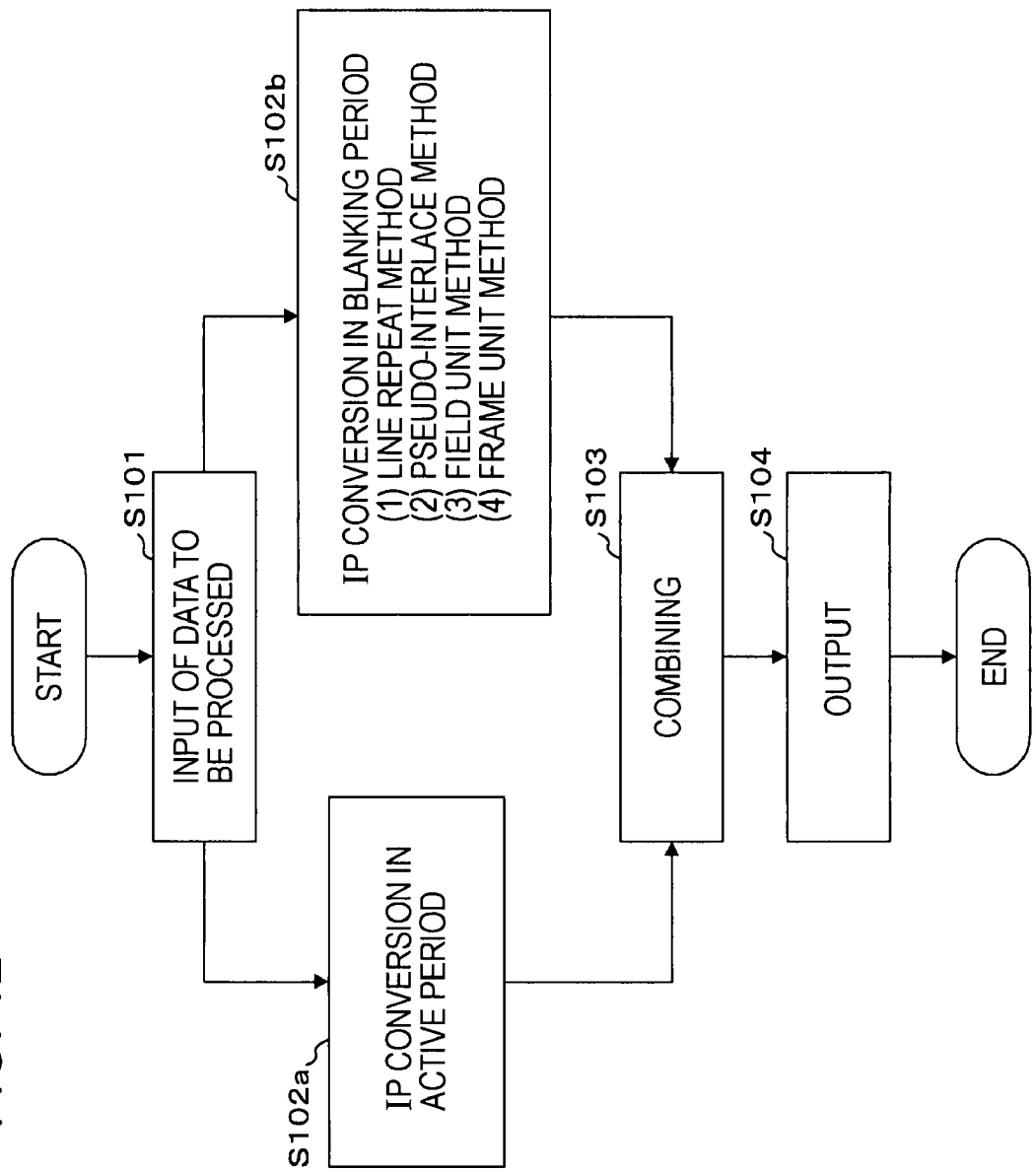
FIG. 12 is a flowchart showing a sequence of processing executed in the image display apparatus according to the embodiment.

Lastly, a sequence of processing executed in the image display apparatus according to this embodiment will be described with reference to a flowchart shown in FIG. 12. The processing according to the flow shown in FIG. 12 is executed by the image display apparatus shown in FIG. 7. The overall processing is controlled by the controller 203 shown in FIG. 7 and a controller (not shown) that outputs system control signals. For example, these controllers include CPUs that control processing according to computer programs recorded in memories.

Now, individual steps in the flowchart shown in FIG. 13 will be described. First, in step S101, data to be processed by IP conversion is input to the memory (FIFO) 201. Then, in steps S102a and S102b, the data input to the memory (FIFO) 201 is read by the active-period IP converter 204 and the blanking-period IP converter 210, where IP conversion is executed individually. As described earlier, the data is read from the memory (FIFO) 201 at a clock rate that is twice or more faster than the rate of the clock defining timing of input of signals to the memory (FIFO) 201 so that data delays caused by the blanking-period IP converter 210 does not cause delay of output.

In step S102a, the active-period IP converter 204 executes IP conversion on data of active pixels, i.e., video-signal periods not including blanking periods, in a manner of interpolation that has hitherto been used. More specifically, as described earlier with reference to FIGS. 1 and 2, pixel values of interpolated pixels are determined by inter-frame interpolation that executes interpolation using lines of temporally preceding and succeeding frames and inter-frame interpolation that executes interpolation using upper and lower lines within the same frame, with the inter-frame interpolation and the intra-frame interpolation used by switching or in combination as controlled in real time in accordance with image features, whereby the interlaced signals are converted into progressive signals and the progressive signals are output to the multiplexer 205.

In step S102b, as described earlier with reference to FIGS. 8 to 11, the blanking-period IP converter 210 executes IP conversion of blanking-period signals by a method selected from the following four methods:
1. Line repeat method
2. Pseudo-interlace method
3. Field unit method
4. Frame unit method As described with reference to FIGS. 8 to 11, the results of processing by the respective methods are as follows:
1. In the line repeat method, an interpolated field is formed by repeating current lines.
2. In the pseudo-interlace method, an interpolated filed is formed by setting black-pixel lines.
3. In the field unit method, an interpolated field is formed using line data of a field previous to a current field.
4. In the frame unit method, an interpolated field is formed using line data of another field in the same frame as a current line.

In step S103, the result of step S102a and the result of step S102b, i.e., active-period signals (video signals) and blanking-period signals obtained through the IP conversion, are combined by the multiplexer 205 shown in FIG. 7. Then, in step S104, the combined data is displayed on a display unit. For example, the display data includes blanking-period signals as described earlier with reference to FIGS. 4 to 6. Furthermore, scaling is executed by the scaler 206 as needed.

As described above, in the processing according to this embodiment, active-pixel periods corresponding to video periods and blanking-signal periods are separated, and IP conversion is executed in different manners in the individual periods. In the IP conversion for the blanking-period signals, without generating interpolated signals having pseudo-pixel values, progressive signals composed only of original interlaced signals or original interlaced signals and black pixels are generated and output. Thus, display data corresponding to the blanking-period signals, obtained through the IP conversion, does not include pseudo-pixels, which are generated in the case of ordinary interpolation. Accordingly, it is possible to check auxiliary data reliably.

The present invention has been described in detail in the context of specific embodiments. However, obviously, it is possible for those skilled in the art to make modifications or alternatives without departing from the spirit of the present invention. That is, the present invention has been disclosed by way of examples, and the present invention should not be construed as limited to the embodiments. The scope of the present invention should be determined on the basis of the claims.

The series of processes described herein can be executed by hardware, by software, or by combination of hardware and software. When the series of processes is executed by software, a program defining the processing sequence is executed by installing the program in a memory of a computer embedded in special hardware or on a general-purpose computer that is capable of executing various processes.

For example, the program may be recorded in a recording medium such as a hard disc or a read-only memory (ROM). Alternatively, the program may be stored (recorded) temporarily or permanently on a removable recording medium such as a flexible disc, a compact disc read-only memory (CD-ROM), a magneto-optical (MO) disc, a digital versatile disc (DVD), a magnetic disc, or a semiconductor memory. Such a removable medium can be provided in the form of what is called package software.

Instead of installing the program from a removable recording medium to a computer, the program may be transferred by wireless from a download site to a computer, or transferred by wire to a computer via a network such as a local area network (LAN) or the Internet, so that the computer can receive the program transferred and install the program on an internal recording medium such as a hard disc.

The various processes described herein need not necessarily be executed sequentially in the orders described, and may be executed in parallel or individually as needed or in accordance with the processing ability of an apparatus that executes the processes. A system in this specification refers to a logical combination of a plurality of apparatuses, irrespective of whether individual constituent components are provided within the same case.

What is claimed is:

1. A frame-holding image display apparatus that displays blanking-period data included in interlaced signals, the blanking-period data being auxiliary data of at least one of audio data and metadata superimposed in a blanking period, the image display apparatus comprising:
   an active-period interlaced-to-progressive converter configured to convert active periods included in interlaced signals into progressive signals, the active periods being periods in which video data is recorded;
   a blanking-period interlaced-to-progressive converter configured to convert blanking periods included in the interlaced signals into progressive signals;
   a multiplexer configured to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods; and
   a display unit configured to display the data output from the multiplexer including display of blanking-period data;
   wherein the blanking-period interlaced-to-progressive converter is configured to generate the progressive signals for the blanking periods by executing interlaced-to-progressive conversion in which (1) interpolation based on pixel values is not executed and (2) lines not existing in the interlaced signal are generated by at least one of (a) original interlaced values copied from the auxiliary data superposed in the blanking periods of the interlaced signals and (b) values corresponding to black pixels are the only values set as pixel values of an interpolated field which is not included in field data of the blanking periods of the interlaced signals.

2. The image display apparatus according to claim 1, wherein the blanking-period interlaced-to-progressive converter is configured to generate the progressive signals associated with the blanking periods by executing the interlaced-to-progressive conversion according to a line repeat method in which a current field is repeatedly set to an interpolated field adjacent to the current field.

3. The image display apparatus according to claim 1, wherein the blanking-period interlaced-to-progressive converter is configured to generate the progressive signals associated with the blanking periods by executing the interlaced-to-progressive conversion according to a pseudo-interlace method in which black pixels are set in an interpolated field adjacent to a current field.

4. The image display apparatus according to claim 1, wherein the blanking-period interlaced-to-progressive converter is configured to generate the progressive signals associated with the blanking periods by executing the interlaced-to-progressive conversion in which data of a preceding field is set to an interpolated field adjacent to a current field.

5. The image display apparatus according to claim 1, wherein the blanking-period interlaced-to-progressive converter is configured to generate the progressive signals associated with the blanking periods by executing the interlaced-to-progressive conversion in which data of a field included in the same frame as a current field but different from the current field is set to an interpolated field adjacent to the current field.

6. A frame-holding signal processing apparatus comprising:
   an active-period interlaced-to-progressive converter configured to convert active periods included in interlaced signals into progressive signals, the active periods being periods in which video data is recorded;
   a blanking-period interlaced-to-progressive converter configured to convert blanking periods included in the interlaced signals into progressive signals; and
   a multiplexer configured to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods;
   wherein blanking-period data being auxiliary data of at least one of audio data and metadata superimposed in the blanking period, the blanking-period interlaced-to-progressive converter is configured to generate the progressive signals for the blanking periods by executing interlaced-to-progressive conversion in which (1) interpolation based on pixel values is not executed and (2) lines not existing in the interlaced signal are generated by at least one of (a) original interlaced values copied from the auxiliary data superposed in the blanking periods of the interlaced signals and (b) values corresponding to black pixels are the only values set as pixel values of an interpolated field which is not included in field data of the blanking periods of the interlaced signals.

7. The signal processing apparatus according to claim 6, wherein the blanking-period interlaced-to-progressive converter is configured to generate the progressive signals associated with the blanking periods by executing the interlaced-to-progressive conversion according to a line repeat method in which a current field is repeatedly set to an interpolated field adjacent to the current field.

8. The signal processing apparatus according to claim 6, wherein the blanking-period interlaced-to-progressive converter is configured to generate the progressive signals associated with the blanking periods by executing the interlaced-to-progressive conversion according to a pseudo-interlace method in which black pixels are set in an interpolated field adjacent to a current field.

9. The signal processing apparatus according to claim 6, wherein the blanking-period interlaced-to-progressive converter is configured to generate the progressive signals associated with the blanking periods by executing the interlaced-to-progressive conversion in which data of a preceding field is set to an interpolated field adjacent to a current field.

10. The signal processing apparatus according to claim 6, wherein the blanking-period interlaced-to-progressive converter is configured to generate the progressive signals associated with the blanking periods by executing the interlaced-to-progressive conversion in which data of a field included in the same frame as a current field but different from the current field is set to an interpolated field adjacent to the current field.

11. An image display method of a frame-holding image display apparatus for displaying blanking-period data included in interlaced signals, the blanking-period data being auxiliary data of at least one of audio data and metadata superimposed in a blanking period, the image display method comprising the steps of:
  causing an active-period interlaced-to-progressive converter to convert active periods included in interlaced signals into progressive signals, the active periods being periods in which video data is recorded;
  causing a blanking-period interlaced-to-progressive converter to convert blanking periods included in the interlaced signals into progressive signals;
  causing a multiplexer to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods; and
  causing a display unit to display the data output from the multiplexer including display of blanking-period data;
  wherein the progressive signals for the blanking periods are generated by executing interlaced-to-progressive conversion in which (1) interpolation based on pixel values is not executed and (2) lines not existing in the interlaced signal are generated by at least one of (a) original interlaced values copied from the auxiliary data superposed in the blanking periods of the interlaced signals and (b) values corresponding to black pixels are the only values set as pixel values of an interpolated field which is not included in field data of the blanking periods of the interlaced signals.

12. A computer program product, embodied on a non-transitory computer readable medium, for causing a frame-holding image display apparatus to display blanking-period data included in interlaced signals, the blanking-period data being auxiliary data of at least one of audio data and metadata superimposed in a blanking period, the computer program product comprising the steps of:
  causing an active-period interlaced-to-progressive converter to convert active periods included in interlaced signals into progressive signals, the active periods being periods in which video data is recorded;
  causing a blanking-period interlaced-to-progressive converter to convert blanking periods included in the interlaced signals into progressive signals;
  causing a multiplexer to receive input of the progressive signals associated with the active periods, generated by the active-period interlaced-to-progressive converter, and the progressive signals associated with the blanking periods, generated by the blanking-period interlaced-to-progressive converter, and to generate and output display data including both the progressive signals associated with the active periods and the progressive signals associated with the blanking periods; and
  causing a display unit to display the data output from the multiplexer including display of blanking-period data;
  wherein the progressive signals for the blanking periods are generated by executing interlaced-to-progressive conversion in which (1) interpolation based on pixel values is not executed and (2) lines not existing in the interlaced signal are generated by at least one of (a) original values interlaced copied from the auxiliary data superposed in the blanking periods of the interlaced signals and (b) values corresponding to black pixels are the only values set as pixel values of an interpolated field which is not included in field data of the blanking periods of the interlaced signals.

* * * * *